(12) United States Patent
Sanvito et al.

(10) Patent No.: US 11,447,668 B2
(45) Date of Patent: Sep. 20, 2022

(54) JOINT COMPOUND

(71) Applicants: Dianne Sanvito, New South Wales (AU); Alberto Sanvito, New South Wales (AU)

(72) Inventors: Dianne Sanvito, New South Wales (AU); Alberto Sanvito, New South Wales (AU)

( * ) Notice: Subject to any disclaimer, the term of this patent is extended or adjusted under 35 U.S.C. 154(b) by 0 days.

(21) Appl. No.: 16/326,348

(22) PCT Filed: Aug. 18, 2017

(86) PCT No.: PCT/AU2017/050880
§ 371 (c)(1),
(2) Date: Feb. 18, 2019

(87) PCT Pub. No.: WO2018/032058
PCT Pub. Date: Feb. 22, 2018

(65) Prior Publication Data
US 2019/0218432 A1 Jul. 18, 2019

(30) Foreign Application Priority Data
Aug. 19, 2016 (AU) ................................ 2016903283

(51) Int. Cl.
| | | |
|---|---|---|
| *C09J 133/00* | (2006.01) | |
| *C09J 11/04* | (2006.01) | |
| *C09J 11/08* | (2006.01) | |
| *C04B 26/06* | (2006.01) | |
| *C04B 26/04* | (2006.01) | |

(52) U.S. Cl.
CPC ............. *C09J 133/00* (2013.01); *C04B 26/04* (2013.01); *C04B 26/06* (2013.01); *C09J 11/04* (2013.01); *C09J 11/08* (2013.01); *Y02W 30/91* (2015.05)

(58) Field of Classification Search
CPC ............ C09J 133/00; C09J 11/04; C09J 11/08
USPC ........................................................ 524/35
See application file for complete search history.

(56) References Cited

U.S. PATENT DOCUMENTS

| | | | | |
|---|---|---|---|---|
| 5,746,822 A | * | 5/1998 | Espinoza ................ | C04B 26/04 106/785 |
| 2006/0096074 A1 | * | 5/2006 | Foster ..................... | C04B 26/04 29/402.01 |
| 2008/0216715 A1 | * | 9/2008 | Langford ............. | C04B 40/0039 106/660 |
| 2012/0071588 A1 | * | 3/2012 | Ingrisch .................. | C04B 26/02 524/5 |
| 2015/0064409 A1 | * | 3/2015 | Takeuchi ................ | B29C 70/86 428/164 |

FOREIGN PATENT DOCUMENTS

| | | |
|---|---|---|
| AU | 43983/72 A | 1/1974 |
| CN | 105255153 A | 1/2016 |
| EP | 0258064 A2 | 3/1988 |
| EP | 0496682 A1 | 7/1992 |
| JP | H0280468 A | 3/1990 |
| JP | H05155649 A | 6/1993 |
| JP | 2014-162826 A | 9/2014 |
| WO | 0050355 A1 | 8/2000 |
| WO | 2008/045028 A2 | 4/2008 |
| WO | 2013/110820 A1 | 8/2013 |
| WO | 2014/052349 A1 | 4/2014 |

OTHER PUBLICATIONS

International Search Report and Written Opinion, International Application No. PCT/AU2017/050811, dated Sep. 15, 2017.
Anon., "Carbon fiber reinforced polymer", Wikpedia (2016), Downloaded from the Internet May 3, 2017, <URL: https://en.wikipedia.org/w/ index.php?title=Carbon_fiber_reinforced_polymer&oldid=734648179>.
European Patent Application No. EP17840634.4, Extended European Search Report dated Feb. 25, 2020, 8 pages.

* cited by examiner

*Primary Examiner* — Deve V Hall
(74) *Attorney, Agent, or Firm* — Kilpatrick Townsend & Stockton LLP

(57) ABSTRACT

A joint compound for use on joints between adjacent wall panels without the need for tape, the joint compound comprising a filler, a binder, carbon fibres and/or carbon nanotubes.

14 Claims, No Drawings

JOINT COMPOUND

TECHNICAL FIELD

The present disclosure relates generally to a joint compound for use on joints between adjacent wall panels and, in particular, a joint compound that can be used without the need for tape.

BACKGROUND

In construction of buildings, interior walls and/or ceilings are formed from prefabricated boards such as fibre cement sheeting, gypsum wallboards, plaster boards and the like. The prefabricated boards are typically fastened to wall frames and the joints between panels filled with a joint compound embedded with a tape layer. Typically, when the base coat containing the tape layer is dry or set, a second layer of a joint compound is applied, followed by a third "finishing coat" which, once dry or set, can be finished in a conventional manner.

There are two general types of joint compound, setting type and drying type. Setting type joint compounds set through a chemical reaction. Setting type joint compounds are typically premixed and set within 1 to 4 hours of applying to the joint, however can be difficult to work and finish.

Drying type joint compounds set through drying, the evaporation of water from the mixture. Drying type compounds are typically supplied in powder form, requiring them to be mixed with water on site. Once mixed, drying type compounds must be used immediately on the joints as the mixture can set in a relatively short time. Having to mix the compound on site can be labour intensive, and the resulting mixture must be used quickly once mixed to avoid waste.

Current setting and drying compounds require the use of a tape layer in the joints to provide adequate strength and flexibility at the joint, as well as to minimise cracking of the joint compound during setting. The process of applying a tape layer to the wall can be time consuming and requires skill to ensure the tape is correctly positioned prior to the setting of the joint compound.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

In a first aspect, there is provided a joint compound for use on joints between adjacent wall panels, the joint compound comprising a filler, a binder and carbon fibres.

The filler may be a filler selected from the group comprising calcium carbonate (limestone), calcium sulphate dihydrate (gypsum), calcium sulphate hemihydrate (plaster of paris), calcium magnesium carbonate (dolomite), magnesium silicate (talc), and combinations thereof.

The binder may be a binder selected from the group comprising acrylic co-polymer emulsions, polyvinyl acetate, polyvinyl alcohol, ethylene vinyl acetate co-polymers, vinyl acrylic copolymers, styrene-butadiene polymers, polyacrylamides, other acrylic polymers, latex emulsions, caseins, and combinations thereof.

The ratio of binder to filler is not particularly limited. For example the ratio may range from about 5:1 to about 1:1.

The ratio of carbon fibres to filler is not particularly limited. For example the ratio may range from about 1:1000 to about 1:50. In some embodiments, the ratio of fibres to filler is from about 1:500 to about 1:300. The fibres may be from about 10 µm in length to about 10 mm in length, for example from about 1 mm to about 5 mm.

The carbon fibres may, for example, be pitch based, polyacrylonitrile (PAN based), rayon (viscose) based or any combination thereof.

The joint compound may further comprise a fibre additive selected from the group comprising cellulose fibres, mineral fibres, synthetic organic fibres and synthetic inorganic fibres, or combinations thereof. The ratio of fibre additive to filler may range from about 1:1 to about 1:10.

The fibre additive may comprise cellulose fibres. The ratio of cellulose fibres to filler may range from about 1:1 to about 1:10.

The fibre additive may comprise polymer fibres. The ratio of polymer fibres to filler may range from about 1:1000 to 1:50.

The joint compound may further comprise one or more additives such as water, defoamers, thickeners, gelling agents, pigments, surfactants, neutralising agents, coalescing agents, surfactants, wetting agents, non-levelling agents, biocides, fungicides and other known additives.

In a second aspect, there is provided a joint compound for use on joints between adjacent wall panels, the joint compound comprising 5 to 50% by weight filler, 5 to 80% by weight binder, 0 to 30% by weight additives, 0.001 to 10% by weight carbon fibres, and 0 to 20% by weight fibre additive.

In a third aspect, there is provided a joint compound for use on joints between adjacent wall panels, the joint compound comprising a filler, a binder and carbon nanotubes.

In a fourth aspect, there is provided a joint compound for use on joints between adjacent wall panels, the joint compound comprising 5 to 40% by weight filler, 5 to 50% by weight binder, 0 to 30% by weight additives, 0.0001 to 1% by weight carbon nanotubes, and 0 to 20% by weight fibre additive.

In a fifth aspect, there is provided a joint compound for use on joints between adjacent wall panels, the joint compound comprising 5 to 40% by weight filler, 30 to 50% by weight binder, 0.001 to 1% by weight carbon fibres, 0.001 to 1% by weight polymer fibres, and 0.01 to 10% by weight cellulose fibres.

In a sixth aspect, there is provided a joint compound for use on joints between adjacent wall panels, the joint compound comprising 5 to 40% by weight filler, 5 to 50% by weight binder, 0 to 30% by weight additives, 0.001 to 1% by weight carbon fibres, and 0 to 20% by weight fibre additive.

DESCRIPTION OF EMBODIMENTS

An embodiment of the invention will now be described, by way of example only, with reference to the following examples.

Examples 1 to 3 below show examples of formulations prepared utilising 3 mm long carbon fibres and a cellulose fibre additive. Properties of the carbon fibres and paper fibres used in Examples 1 and 2 are shown in Tables 1 and 2, respectively.

TABLE 1

Carbon Fibre Properties

| | |
|---|---|
| Single fibre diameter | 7.0 to 10 μm |
| Tensile strength | 3.0 to 3.6 GPa |
| Tensile modulus | 220 to 240 GPa |
| Carbon content | >93% |
| Elongation percent | 1.5% |
| Density | 1.6 to 1.76 g/cm$^3$ |
| Colour | Black |
| Volume resistivity | $1.5 \times 10^{-3}$ ohms/cm |

TABLE 2

Cellulose Fibre Properties

| | |
|---|---|
| Diameter (ave) | 20 μm |
| Specific gravity | 1.1 |
| Moisture content (ave) | 3% |
| Oil absorption | 3.71 |
| Retention 325 mesh | 28% |

Example 1

A tapeless joint compound was made in accordance with the formulation shown in Table 3.

TABLE 3

Formula F4-A1

| Ingredient | Quantity |
|---|---|
| Water | 250 KG |
| Liquid Defoamer (Foamaster DF 50) | 1.5 KG |
| Thickener (Mecellose PMC 40 HS) | 2 KG |
| Pigment Dispersant (Orotan 731 DP) | 2 KG |
| Neutralising Agent (Vantex-T) | 1 L |
| Wetting Agent (Carbowet GA 100) | 1 L |
| Mix until dissolved | |
| Non-Leveling Agent (Celite 281) | 50 KG |
| Cellulose Fibre (Gel-Cel Fibre W10) | 25 KG |
| Filler (Omyacarb 10) | 200 KG |
| Filler (Omyacarb 20) | 100 KG |
| Mix at high speed for 10 minutes | |
| Wetting Agent (Envirogem 360/Dynol 360) | 5 KG |
| Smoothing Agent (Dowanol DPnB) | 5 KG |
| Binder (Hydrocryl 360) | 400 KG |
| Binder (Hydrocryl 440) | 100 KG |
| Biocide (Acticide MBS) | 1.5 KG |
| Biocide (Acticide EP (W)) | 4 KG |
| Thickener (Acryltix CP) | 2 KG |
| Change mixer to putty mixer | |
| Cellulose Fibre (Gel-Cel Fibre W10) | 100 KG |
| Carbon Fibre (3 mm) | 1 KG |

Example 2

A joint compound was prepared in accordance with the formulation shown in Table 4.

TABLE 4

Formula F4-A2

| Ingredient | Quantity |
|---|---|
| Water | 250 KG |
| Liquid Defoamer (Foamaster DF 50) | 1.5 KG |
| Thickener (Mecellose PMC 40 HS) | 2 KG |
| Pigment Dispersant (Orotan 731 DP) | 2 KG |
| Neutralising Agent (AMP 95) | 1 L |

TABLE 4-continued

Formula F4-A2

| Ingredient | Quantity |
|---|---|
| Wetting Agent (Teric N9) | 1 L |
| Mix until dissolved | |
| Non-Leveling Agent (Celite 281) | 50 KG |
| Cellulose Fibre (Gel-Cel Fibre W10) | 25 KG |
| Filler (Omyacarb 10) | 400 KG |
| Filler (Omyacarb 20) | 100 KG |
| Mix at high speed for 10 minutes | |
| Coalescing Agent (Texanol) | 5 KG |
| Smoothing Agent (Butyl Icinol) | 5 KG |
| Binder (Hydrocryl 360) | 400 KG |
| Binder (Hydrocryl 440) | 100 KG |
| Biocide (Acticide FS(N)) | 1.5 KG |
| Biocide (Acticide EP(W))) | 4 KG |
| Thickener (Acryltix CP) | 2 KG |
| Change mixer to putty mixer | |
| Cellulose Fibre (Gel-Cel Fibre W10) | 100 KG |
| Carbon Fibre (3 mm) | 1 KG |

Example 3

A joint compound was prepared in accordance with the formulation shown in Table 5.

TABLE 4

Formula F9-A

| Ingredient | Quantity |
|---|---|
| Water | 50 KG |
| Liquid Defoamer (Foamaster MO 2134) | 500 mL |
| Gelling Agent (Palygel Omya) | 2 KG |
| Thickener (Mecellose PMC 40 HS) | 600 g |
| Pigment Dispersant (Orotan 731 DP) | 1 KG |
| Neutralising Agent (AMP 95) | 300 mL |
| Surfactant (Strodex TH 100) | 1 L |
| Mix until dissolved | |
| Coalescing Agent (Texanol/K Flex) | 3 KG |
| Binder (Hydrocryl 399) | 140 KG |
| Binder (Hydrocryl 440) | 50 KG |
| Biocide (Acticide MB(S)) | 600 mL |
| Biocide (Acticide EP(W))) | 400 mL |
| Mix at high speed for 10 minutes | |
| Carbon Fibre | 3 KG |
| Cellulose Fibre (Gel-Cel Fibre W10) | 30 KG |
| Polymer Fibre (Mini Fiber ESS50F) | 2 KG |
| Non-Leveling Agent (Celite 281/Wollsatonite 425) | 30 KG |
| Filler (Omyacarb 10/Mica 260C) | 75 KG |
| Pigment (TiO$_2$) | 10 KG |
| Liquid Defoamer (Foamaster MO 2134) | 1 L |
| Change mixer to putty mixer | |
| Filler (Limestone 60-16) | 100 KG |
| Liquid Defoamer (Foamaster MO 2134) | 1 L |
| Thickener (Acryltyx CP) | 5 L |

Strength Testing

For a tapeless joint compound to be a viable alternative to current joint compounds utilising tape, it is important that joints formed with the tapeless compound are at least as strong as those using traditional joint compounds with tape. The above formulations were tested for strength and compared with industry standard for joints made with joint compounds and tape in the following manner.

A substrate is prepared joining two sheets of fibre cement sheet or plasterboard. The joint is treated with two coats of the joint compound and one coat of a topping compound. The prepared substrate is affixed to a frame with screws at the top left and right corners and chains attached to the bottom left and right corners suspending a wooden platform. 25 kg weights are added at 30 second intervals to the wooden platform until breaking point.

TABLE 6

Strength testing results

| Joint compound | Substrate | Maximum weight held | Comment |
|---|---|---|---|
| Industry standard (with paper tape) | Fibre cement sheet | 75 kg | Substrate breaking at 100 kg |
| Formula F4-A1 (with no tape) | Fibre cement sheet | 150 kg | Substrate breaking at 150 kg, joint did not fail No cracking or deterioration of compound evident |
| Formula F4-A2 (with no tape) | Fibre cement sheet | 175 kg | Substrate breaking at 150 kg, joint did not fail No cracking or deterioration of compound evident |
| Industry standard (with paper tape) | Plasterboard | 120 kg | |
| Formula F4-A1 (with no tape) | Plasterboard | 180 kg | Substrate breaking at 180 kg, joint did not fail No cracking or deterioration of compound evident |
| Formula F4-A2 (with no tape) | Plasterboard | 180 kg | Substrate breaking at 180 kg, joint did not fail No cracking or deterioration of compound evident |

As can be seen from Table 6 above, the tapeless joints formed with Formula F4-A1 and Formula F4-A2 matched and exceeded the industry standard joints using paper tape for strength.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A joint compound for use on joints between adjacent wall panels, the joint compound comprising:
   a filler selected from the group consisting of calcium carbonate, calcium sulphate dihydrate, calcium sulphate hemihydrate, calcium magnesium carbonate, magnesium silicate, and combinations thereof;
   a binder selected from the group consisting of acrylic co-polymer emulsions, polyvinyl acetate, polyvinyl alcohol, ethylene vinyl acetate co-polymers, vinyl acrylic copolymers, styrene-butadiene polymers, polyacrylamides, other acrylic polymers, latex emulsions, caseins, and combinations thereof;
   carbon fibres; and
   from 5% to 20% by weight fibre additive selected from the group consisting of cellulose fibres, polymer fibres, mineral fibres, synthetic organic fibres and synthetic inorganic fibres, and combinations thereof,
   wherein the ratio of carbon fibres to filler is from about 1:1000 to about 1:50 by weight, and
   wherein the ratio of fibre additive to filler is from 1:1 to about 1:10 by weight.

2. The joint compound according to claim 1, wherein the ratio of binder to filler is from about 5:1 to about 1:1 by weight.

3. The joint compound according to claim 1, wherein the ratio of carbon fibres to filler is from about 1:500 to about 1:300 by weight.

4. The joint compound according to claim 1, wherein the carbon fibres are from about 10 μm to about 10 mm in length.

5. The joint compound according to claim 4, wherein the carbon fibres are fibres from about 1 mm to about 5 mm in length.

6. The joint compound according to claim 1, wherein the carbon fibres are selected from the group consisting of pitch based, polyacrylonitrile (PAN) based, rayon (viscose) based, and combinations thereof.

7. The joint compound according to claim 1, wherein the fibre additive comprises cellulose fibres.

8. The joint compound according to claim 7, wherein the ratio of cellulose fibres to filler is from about 1:1 to about 1:10 by weight.

9. The joint compound according claim 1, wherein the fibre additive comprises polymer fibres.

10. The joint compound according to claim 9, wherein the ratio of polymer fibres to filler is from about 1:1000 to about 1:50 by weight.

11. The joint compound according to claim 1, further comprising one or more additives.

12. The joint compound according to claim 11, wherein the one or more additives are selected from the group consisting of water, defoamers, thickeners, gelling agents, pigments, surfactants, neutralising agents, coalescing agents, surfactants, wetting agents, non-levelling agents, biocides, fungicides, and combinations thereof.

13. The joint compound according to claim 1 comprising:
   5 to 40% by weight filler;
   5 to 50% by weight binder;
   0 to 30% by weight additives;
   0.001 to 5% by weight carbon fibres; and
   5 to 20% by weight fibre additive.

14. The joint compound according to claim 13 comprising:
   5 to 40% by weight filler;
   30 to 50% by weight binder;
   0.001 to 5% by weight carbon fibres;
   0.001 to 1% by weight polymer fibres; and
   0.01 to 10% by weight cellulose fibres.

* * * * *